United States Patent [19]

Wilhelm

[11] 3,723,556

[45] Mar. 27, 1973

[54] HYDROCARBON ISOMERIZATION PROCESS

[75] Inventor: Frederick C. Wilhelm, Arlington Heights, Ill.

[73] Assignee: Universal Oil Products Company, Des Plaines, Ill.

[22] Filed: Mar. 1, 1972

[21] Appl. No.: 231,033

Related U.S. Application Data

[60] Division of Ser. No. 36,375, May 11, 1970, Pat. No. 3,705,111, which is a continuation-in-part of Ser. No. 15,960, March 2, 1970.

[52] U.S. Cl.........260/668 A, 260/683.2, 260/683.65
[51] Int. Cl...............................................C07c 5/24
[58] Field of Search...........260/668 A, 683.2, 683.65

[56] References Cited

UNITED STATES PATENTS

| | | | |
|---|---|---|---|
| 3,165,479 | 1/1965 | Burk et al. | 252/466 P X |
| 3,607,961 | 9/1971 | Kouzch et al. | 260/668 A |
| 3,642,925 | 2/1972 | Rausch | 260/668 A |
| 3,686,340 | 8/1972 | Patrick et al. | 260/683.3 |

*Primary Examiner*—Curtis R. Davis
*Attorney*—James R. Hoatson, Jr. et al.

[57] ABSTRACT

Isomerizable hydrocarbons are isomerized using a catalytic composite comprising a combination of a platinum group component, a Group IV-A metallic component, and a nickel component with a porous carrier material. A catalytic composite comprising a platinum group component, a Group IV-A metallic component, a nickel component and a Friedel-Crafts metal halide component combined with a refractory inorganic oxide is also disclosed.

20 Claims, No Drawings

HYDROCARBON ISOMERIZATION PROCESS

CROSS-REFERENCES TO RELATED APPLICATIONS

This application is a division of my copending application Ser. No. 36,375, filed May 11, 1970, now U.S. Pat. No. 3,705,111 issued Dec. 5, 1972, which is, in turn, a continuation-in-part of my copending application Ser. No. 15,960, filed Mar. 2, 1970, the teachings of both of which applications are specifically incorporated herein.

BACKGROUND OF THE INVENTION

This invention relates to a process for isomerizing isomerizable hydrocarbons including isomerizable paraffins, cycloparaffins, olefins and alkylaromatics. More particularly, this invention relates to a process for isomerizing isomerizable hydrocarbons with a catalytic composite comprising a combination of a platinum group component, a Group IV-A metallic component, and a nickel component with a porous carrier material. More precisely, the present invention involves a process utilizing a dual-function catalytic composite having both a hydrogenation-dehydrogenation function and an acid function which enables substantial improvements in hydrocarbon isomerization processes that have traditionally used dual-function catalysts.

Processes for the isomerization of hydrocarbons have acquired importance in the petrochemical and petroleum refining industries. The demand for the various xylene isomers, particularly para-xylene, has created a need for processes to isomerize the other xylene isomers and ethylbenzene to produce the desired para-xylene. Also, the demand for branched chain paraffins such as isobutane or isopentane for the production of high octane motor fuel alkylate can be met by isomerizing the corresponding normal paraffins. In addition, in the alkylate produced by paraffin-olefin alkylation, it is desired that the product be highly branched to provide a high octane rating. This can be accomplished by alkylating isobutane or isopentane with a $C_4$-$C_7$ internal olefin which, in turn, can be produced by isomerization of the corresponding linear alpha-olefin to shift the double bond to a more centrally located position.

Catalytic composites exhibiting a dual hydrogenation-dehydrogenation function and a cracking function are widely used in the petroleum and petrochemical industries to isomerize isomerizable hydrocarbons. These catalysts are generally characterized as having a heavy metal component, such as metals or metallic compounds of Group V through VIII of the Periodic Table, particularly the Group VIII metals, to impart a hydrogenation-dehydrogenation function when associated with an acid-acting, adsorptive, refractory inorganic oxide which imparts a cracking function. In these isomerization reactions, it is important that the catalytic composite not only catalyze the specific isomerization reactions involved with a minimum of side reactions by having its dual hydrogenation-dehydrogenation function correctly balanced against its acid function, but, further, that the catalyst also be able to perform its desired function equally well over prolonged periods of time.

Performance of a given catalyst in a hydrocarbon isomerization process is typically measured by the activity, selectivity, and stability of the catalyst. Activity refers to the ability to isomerize the hydrocarbon reactants to the corresponding isomers at a specified set of reaction conditions; selectivity refers to the percent of the converted reactants isomerized to form the desired isomerized product and/or products; and stability refers to the rate of change of the selectivity and/or activity of the catalyst.

The principal cause of instability (i.e., loss of selectivity and activity in an originally selective, active catalyst) is the formation of coke on the catalytic surface of the catalyst in the course of the reaction; this coke being characterized as a high molecular weight hydrogen-deficient carbonaceous material, typically having an atomic carbon to hydrogen ratio of about 1 or more. Accordingly, a major problem in the hydrocarbon isomerization art is the development of a more active and selective composite that is not as sensitive to the presence of the foregoing carbonaceous materials and/or has the ability to suppress the rate of the formation of these carbonaceous materials on the catalyst. A primary aim of the art is to develop a hydrocarbon isomerization process utilizing a dual-function catalyst having superior activity, selectivity, and stability. In particular, it is desired to have a hydrocarbon isomerization process wherein isomerizable hydrocarbons are isomerized without excessive cracking or other decomposition reactions which lower the overall yield of the process and make it more difficult and uneconomical to operate.

SUMMARY OF THE INVENTION

Accordingly, it is an object of this invention to provide a process for isomerizing isomerizable hydrocarbons. More specifically, it is an object of this invention to provide an isomerization process using a particular isomerization catalyst effective in isomerizing isomerizable hydrocarbons without introducing undesired decomposition and/or cracking reactions. It is a further object of this invention to provide a process for isomerizing isomerizable hydrocarbons utilizing a dual-function catalyst having superior activity, selectivity, and stability relative to the existing catalysts available to the art.

An isomerization process has now been developed utilizing a dual-function catalyst which possesses improved activity, selectivity, and stability. Moreover, in the particular case of a $C_8$ alkylaromatic isomerization process, this catalyst produces essentially equilibrium conversion of the $C_8$ alkylaromatics to a desired specific xylene isomer with essentially stoichiometric selectivity without excessive production of hydrogenated or cracked products. Further, the activity and selectivity are readily maintainable at their originally high level, yielding a very stable catalytic alkylaromatic isomerization process. This process utilizes a catalyst comprising a combination of a platinum group component, a nickel component, and a Group IV-A metallic component with a porous, carrier material. The process of the present invention involves utilizing a catalyst wherein a controlled amount of nickel and Group IV-A metallic component is added to a dual-function hydrocarbon conversion catalyst containing a platinum group component, providing performance characteristics associated with this process which are an improvement over the art.

In a broad embodiment, this invention relates to a process for isomerizing an isomerizable hydrocarbon which comprises contacting said hydrocarbon, at isomerization conditions, with a catalytic composite comprising a combination of catalytically effective amounts of a platinum group component, a nickel component, and a Group IV-A metallic component with a porous carrier material. In a more limited embodiment, this catalytic composite contains, on an elemental basis, about 0.01 to about 2 wt.% platinum group metal, about 0.01 to about 5 wt.% nickel, and about 0.1 to about 5 wt.% Group IV-A metal.

In a more specific embodiment, this invention relates to the isomerization of either a saturated or an olefinic isomerizable hydrocarbon by contacting either hydrocarbon with the aforementioned catalytic composites at isomerization conditions which include a temperature of about 0°C. to about 425°C., a pressure of about atmospheric to about 100 atmospheres, and a liquid hourly space velocity of about 0.1 to about 10 hr.$^{-1}$. In another limited embodiment, this process relates to the isomerization of an isomerizable alkyl-aromatic hydrocarbon by contacting the alkylaromatic with the aforementioned catalytic composites at isomerization conditions which include a temperature of about 0°C. to about 600°C., a pressure of about atmospheric to about 100 atmospheres, and a liquid hourly space velocity of about 0.1 to about 20 hr.$^{-1}$ and a hydrogen to hydrocarbon mole ratio of about 1:1 to about 20:1.

Other objects and embodiments referring to alternative isomerizable hydrocarbons and to alternative catalytic compositions will be found in the following further detailed description of this invention.

DESCRIPTION OF PREFERRED EMBODIMENTS

The process of this invention is applicable to the isomerization of isomerizable hydrocarbons including acyclic paraffins and cyclic naphthenes. It is particularly suitable for the isomerization of straight chain or mildly branched chain paraffins containing four or more carbon atoms per molecule such as normal butane, normal pentane, normal hexane, normal heptane, normal octane, etc., and mixtures thereof. Cycloparaffins applicable are those ordinarily containing at least five carbon atoms in the ring such as alkylcyclopentanes and cyclohexanes, including methylcyclopentane, dimethylcyclopentane, cyclohexane, methylcyclohexane, dimethylcyclohexane, etc. This process also applies to the conversion of mixtures of paraffins and/or naphthenes such as those derived by selective fractionation and distillation of straight-run natural gasolines and naphthas. Such mixtures of paraffins and/or naphthenes include the so-called pentane fractions, hexane fractions, and mixtures thereof. It is not intended, however, to limit this invention to these enumerated saturated hydrocarbons, and it is contemplated that straight or branched chain saturated hydrocarbons containing up to about 20 carbon atoms per molecule may be isomerized according to the process of the present invention with $C_4$–$C_9$ hydrocarbons being particularly preferred.

The olefins applicable in this isomerization process are generally a mixture of olefinic hydrocarbons of approximately the same molecular weight, including the 1-isomer, 2-isomer, and other position isomers, capable of undergoing isomerization to an olefin in which the double bond occupies a more centrally located position in the hydrocarbon chain. The process of this invention can be used to provide an olefinic feedstock for motor fuel alkylation purposes containing an optimum amount of the more centrally located double bond isomers, by converting the 1-isomer, or other near terminal position isomers into olefins wherein the double bond is more centrally located in the carbon atoms chain. The process of this invention is thus applicable to the isomerization of isomerizable olefinic hydrocarbons such as the isomerization of 1-butene to 2-butene or the isomerization of the 3-methyl-1-butene to 2-methyl-2-butene. Also the process of this invention can be utilized to shift the double bond of an olefinic hydrocarbon such as 1-pentene, 1-hexene, 2-hexene, and 4-methyl-1-pentene to a more centrally located position so that 2-pentene, 2-hexene, 3-hexene and 4-methyl-2-pentene, respectively, can be obtained. It is not intended to limit this invention to these enumerated olefinic hydrocarbons as it is contemplated that shifting of the double bond to a more centrally located position may be effective in straight or branched chain olefinic hydrocarbons containing up to about 20 carbon atoms per molecule. Particularly preferred are the $C_4$–$C_7$ isomerizable olefins. The process of the present invention is not only applicable to the isomerization of the olefinic bond of the olefin but also to the skeletal isomerization of the carbon skeleton of the olefin to produce branched or more highly branched olefins such as the isomerization of 1-pentene to 3-methyl-1-butene and/or 2-methyl-2-butene. The process of this invention also includes the hydroisomerization of an olefin wherein an olefin is simultaneously hydrogenated and isomerized to produce a branched or more highly branched paraffin such as the hydroisomerization of a normal pentene (1-pentene, 2-pentene, etc.) to isopentane or the hydroisomerization of a normal hexene to a methyl pentane and/or dimethylbutanes. Thus, the term isomerization of olefins as used herein include double-bond shift carbon skeletal rearrangement or the simultaneous hydrogenation-isomerization of olefins.

The process of this invention is also applicable to the isomerization of isomerizable alkyl-aromatic hydrocarbons including ortho-xylene, metaxylene, para-xylene, ethylbenzene, the ethyltoluenes, the trimethylbenzenes, the diethylbenzenes, the triethylbenzenes, normal propylbenzene, isopropylbenzene, etc., and mixtures thereof. Preferred isomerizable alkylaromatic hydrocarbons are the monocyclic alkylaromatic hydrocarbons, that is, the alkylbenzene hydrocarbons, particularly the $C_8$ alkylbenzene and non-equilibrium mixtures of the various $C_8$ aromatic isomers. Higher molecular weight alkylaromatic hydrocarbons such as the alkylnaphthalenes, the alkylanthracenes, the alkylphenanthrenes, etc., are also suitable.

These foregoing isomerizable hydrocarbons may be derived as selective fractions from various naturally occurring petroleum streams either as individual components or as certain boiling range fractions obtained by the selective fractionation and distillation of catalytically cracked gas oil. Thus, the process of this invention may be successfully applied to and utilized for complete conversion of isomerizable hydrocarbons when these isomerizable hydrocarbons are present in minor quantities in various fluid or gaseous streams. Thus, the isomerizable hydrocarbons for use in the process of this invention need not be concentrated. For example, isomerizable hydrocarbons appear in minor quantities in various refinery streams usually diluted with gases such as hydrogen, nitrogen, methane, ethane, propane, etc. These refinery streams containing minor quantities of isomerizable hydrocarbons are obtained in petroleum refineries and various refinery installations including thermal cracking units, catalytic cracking units, thermal reforming units, coking units, polymerization units, dehydrogenation units, etc. Such refinery off-streams have in the past been burned for fuel value since an economical process for the utilization of the hydrocarbon content has not been available. This is particularly true for refinery fluid streams known as off-gas streams containing minor quantities of isomerizable hydrocarbons. In addition, this process is capable of isomerizing aromatic streams such as reformate to produce xylenes, particularly para-xylene, thus, upgrading the reformate from its gasoline value to a high petrochemical value.

As indicated the catalyst to be utilized in the process of the present invention comprises a porous carrier material or support having combined therewith catalytically effective amounts of a platinum group component, a nickel component, and a Group IV-A metallic component. Considering first the porous carrier material utilized in the present invention, it is preferred that the material be a porous, adsorptive, high-surface area support having a surface area of about 25 to about 500 $m^2/gm$. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide magnesia, thoria, boria, silica-alumina, silica magnesia, chromia-alumina, alumina-boria, silica-zirconia, etc.; (5) crystalline aluminosilicates such as naturally occurring or synthetically prepared mordenite and/or faujasite, either in the hydrogen form on in a form which has been treated with multivalent cations; and, (6) combination of elements from one or more of these groups. The preferred porous carrier materials for use in the present invention are refractory inorganic oxides, with best results obtained with an alumina carrier material. Suitable alumina materials are the crystalline aluminas known as the gamma-, eta-, and theta-aluminas, with gamma-alumina giving best results. In addition, in some embodiments, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 gm/cc and surface area characteristics such that the average pore diameter is about 20 to 300 Angstroms, the pore volume is about 0.1 to about 1 ml/gm and the surface area is about 100 to about 500 $m^2/gm$. In general, excellent results are typically obtained with a gamma-alumina carrier material which is used in the form of spherical particles having a relatively small diameter (i.e., typically about one-sixteenth inch), an apparent bulk density of about 0.5 gm/cc, a pore volume of about 0.4 ml/gm, and a surface area of about 175 $m^2/gm$.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention, a particularly preferred form of alumina is the sphere. Alumina spheres may be continuously manufactured by the well known oil drop method which comprises forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400°F. and subjected to a calcination procedure at a temperature of about 850°F. to about 1,300°F. for a period of about 1 to about 20 hours. This treatment effects conversion of the alumina hydrogel to the corresponding crystalline gamma-alumina. See the teaching of U. S. Pat. No. 2,620,314 for additional details.

One essential constituent of the instant catalytic composite to be utilized in the present invention is a Group IV-A metallic component. The generic term "Group IV-A metallic component" is intended to include the metals and compounds of the metals of Group IV-A of the Periodic Table. More specifically, it is intended to include germanium and the compounds of germanium; tin and the compounds of tin; lead and the compounds of lead; and mixtures of these metals and/or compounds of metals. This Group IV-A metallic component may be present in the catalytic composite as an elemental metal, or in chemical combination with one or more of the other ingredients of the composite, or as a chemical compound of the Group IV-A metal such as the oxide, sulfide, halide, oxyhalide, oxychloride, aluminate, and the like compounds. Based on evidence currently available, it is believed that best results are obtained when the Group IV-A metallic component exists in the final composite in an oxidation state above that of the elemental metal, and the subsequently described oxidation and reduction steps, that are preferably used in the preparation of the instant composite, are believed to result in a catalytic composite which contains an oxide of the Group IV-A metallic component such as germanium oxide, tin oxide and lead oxide. Regardless of the state in which this component exists in the composite, it can be utilized therein in any amount which is catalytically effective, with the preferred amount being about 0.01 to about 5 wt.% thereof, calculated on an elemental basis. The exact amount selected within this broad range is preferably determined as a function of the particular Group IV-A metal that is utilized. For instance, in the case where this component is lead, it is preferred to select the amount of this component from the low end of this range—namely, about 0.01 to about 1 wt.%. Additionally, it is preferred to select the amount of lead as a function of the amount of the platinum group component as explained hereinafter. In the case where this component is tin, it is preferred to select from a relatively broader range of about 0.05 to about 2 wt.% thereof. And, in the preferred case, where this component is germanium, the selection can be made from the full breadth of the stated range—specifically, about 0.01 to about 5 wt.%, with best results at about 0.05 to about 2 wt.%. This Group IV-A component may be incorporated in the composite in any suitable manner known to the art such as by coprecipitation or cogellation with the porous carrier material, ion exchange with the carrier material, or impregnation of the carrier material at any stage in its preparation. It is to be noted that it is intended to include within the scope of the present invention all conventional procedures for incorporating a metallic component in a catalytic composite, and the particular method of incorporation used is not deemed to be an essential feature of the present invention. However, best results are believed to be obtained when the Group IV-A component is uniformly distributed throughout the porous carrier material. One acceptable method of incorporating the Group IV-A component into the catalytic composite involves cogelling the Group IV-A component during the preparation of the preferred carrier material, alumina. This method typically involves the addition of a suitable soluble compound of the Group IV-A metal of interest to the alumina hydrosol. The resulting mixture is then commingled with a suitable gelling agent, such as a relatively weak alkaline reagent, and the resulting mixture is thereafter preferably gelled by dropping into a hot oil bath as explained hereinbefore. After aging, drying and calcining the resulting particles, there is obtained an intimate combination of the oxide of the Group IV-A metal and alumina. One preferred method of incorporating this component into the composite involves utilization of a soluble, decomposable compound of the particular Group IV-A metal of interest to impregnate the porous carrier material either before, during or after the carrier material is calcined. In general, the solvent used during this impregnation step is selected on the basis of its capability to dissolve the desired Group IV-A compound without affecting the porous carrier material which is to be impregnated; ordinarily, good results are obtained when water is the solvent; thus the preferred Group IV-A compounds for use in this impregnation step are typically water-soluble and decomposable. Examples of suitable Group IV-A compounds are germanium difluoride, germanium tetrafluoride, germanium monosulfide, tin dibromide, tin dibromide di-iodide, tin dichloride di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the Group IV-A component is germanium, a preferred impregnation solution is germanium tetrachloride dissolved in anhydrous ethanol. In the case of tin, tin chloride dissolved in water is preferred. And in the case of lead, lead nitrate in water is preferred. Regardless of which impregnation solution is utilized, the Group IV-A component can be impregnated either prior to, simultaneously with, or after the other metallic components are added to the carrier material. Ordinarily, best results are obtained when this component is impregnated simultaneously with the other metallic components of the composite. Likewise, best results are ordinarily obtained when the Group IV-A component is germanium or a compound of germanium. Regardless of which Group IV-A compound is used in the preferred impregnation step, it is important that the Group IV-A metallic component be uniformly distributed throughout the carrier material. In order to achieve this objective, it is necessary to maintain the pH of the impregnation solution in a range of about 1 to about 7 and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1 or more. Similarly, it is preferred to use a relatively long contact time during the impregnation step ranging from about one-fourth hour up to about one-half hour or more before drying to remove excess solvent in order to insure a high dispersion of the Group IV-A metallic component on the carrier material. The carrier material is, likewise, preferably constantly agitated during this preferred impregnation step.

As indicated, a second essential ingredient of the catalyst to be utilized in the present invention is the platinum group component. Although the process of the present invention is specifically directed to the use of a catalytic composite containing platinum, it is intended to include other platinum group metals such as palladium, rhodium, ruthenium, osmium, and iridium. The platinum group component such as platinum, may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2 wt.% of the final catalytic composite, calculated on an elemental basis. Excellent results are obtained when the catalyst contains about 0.05 to about 1 wt.% of the platinum group metal. The preferred platinum group component is platinum or a compound of platinum, or palladium or a compound of palladium.

The platinum group component may be incorporated in the catalytic composite in any suitable manner such as coprecipitation, cogellation, ion-exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of chloroplatinic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, palladium nitrate, palladium sulfate, etc. The utilization of a platinum chloride compound, such as chloroplatinic acid is preferred since it facilitates the incorporation of both the platinum component and at least a minor quantity of the preferred halogen component in a single step. Hydrogen chloride or the like acid is also generally added to the impregnation solution in order to further facilitate the incorporation of the halogen component and the distribution of the metallic component. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Yet another essential ingredient of the catalytic composite to be utilized in the present invention is a nickel component. This component may be present in the composite as an elemental metal or in chemical combinations with one or more of the other ingredients of the composite, or as a chemical compound of nickel such as nickel oxide, sulfide, halide oxychloride, aluminate and the like. Best results are believed to be obtained when the composite contains this component in the elemental state, and the preferred preparation procedure which is given in Illustration I is believed to result in this condition. The nickel component may be utilized in the composite in any amount which is catalytically effective, with the preferred amount being about 0.01 to about 5 wt.% thereof, calculated on an elemental nickel basis. Typically, best results are obtained with about 0.05 to about 2 wt.% nickel. It is, additionally, preferred to select the specific amount of nickel from within this broad weight range as a function of the amount of the platinum group component, on an atomic basis, as is explained hereinafter. The nickel component may be incorporated into the catalytic composite in any suitable manner known to those skilled in the catalyst formulation art. In addition, it may be added at any stage of the preparation of the composite—either during preparation of the carrier material or thereafter—since the precise method of incorporation used is not deemed to be critical. However, best results are thought to be obtained when the nickel component is relatively uniformly distributed throughout the carrier material, and the preferred procedures are the ones that are known to result in a composite having a relatively uniform distribution. One acceptable procedure for incorporating this component into the composite involves cogelling the nickel component during the preparation of the preferred carrier material, alumina. This procedure usually comprehends the addition of a soluble, decomposable compound of nickel such as nickel chloride to the alumina hydrosol before it is gelled. The resulting mixture is then finished by conventional gelling, aging, drying and calcination steps as explained hereinbefore. One preferred way of incorporating this component is an impregnation step wherein the porous carrier material is impregnated with a suitable nickel-containing solution either before, during or after the carrier material is calcined. Preferred impregnation solutions are aqueous solutions of water-soluble, decomposable nickel compounds such as nickel bromate, nickel bromide, nickel perchlorate, nickel chloride, nickel fluoride, nickel iodide, nickel nitrate, nickel sulfate, and the like compounds. Best results are ordinarily obtained when the impregnation solution is an aqueous solution of nickel chloride or nickel nitrate. This nickel component can be added to the carrier material, either prior to, simultaneously with, or after the other metallic components are combined therewith. Best results are usually achieved when this component is added simultaneously with the other metallic components. In fact, excellent results have been obtained, as reported in the examples, with a one step impregnation procedure using an aqueous solution comprising chloroplatinic acid, nickel chloride, hydrochloric acid and a suitable compound of the desired Group IV-A metal.

A preferred ingredient of the instant catalytic composite is a halogen component. Accordingly, a preferred embodiment of the present invention involves the utilization of a catalytic composite comprising a combination of catalytically effective amounts of a platinum group component, a nickel component, a Group IV-A metallic component, and a halogen component with an alumina carrier material. Although the precise form of the chemistry of the association of the halogen component with the carrier material is not entirely known, it is customary in the art to refer to the halogen component as being combined with the carrier material, or with the other ingredients of the catalyst. This combined halogen may be either fluorine, chlorine, iodine, bromine, or mixtures thereof. Of these, fluorine and chlorine are preferred for the purposes of the present invention. The halogen may be added to the carrier material in any suitable manner either during preparation of the support or before or after the addition of the other components. For example, the halogen may be added at any stage of the preparation of the carrier material or to the calcined carrier material, as an aqueous solution of an acid such as hydrogen fluoride, hydrogen chloride, hydrogen bromide, etc. The halogen component or a portion thereof may be combined with the carrier material during the impregnation of the latter with the platinum group component; for example, through the utilization of a mixture of chloroplatinic acid, and hydrogen chloride. In another situation, the alumina hydrosol which is typically utilized to form the preferred alumina carrier material may contain halogen and thus contribute at least a portion of the halogen component to the final composite. For utilization in the isomerization process of the present invention, the halogen will be typically combined with the carrier material in an amount sufficient to result in a final composite that contains about 0.1 to about 10 wt.% and preferably about 0.1 to about 5 wt.% of halogen calculated on an elemental basis.

Regarding the preferred amounts of the various metallic components of the subject catalyst, I have found it to be a good practice to specify the amounts of the nickel component and of the Group IV-A metallic component as a function of the amount of the platinum group component. On this basis, the amount of the nickel component is ordinarily selected so that the atomic ratio of nickel to the platinum group metal contained in the composite is about 0.2:1 to about 20:1, with the preferred range being about 1:1 to 20:1. Similarly, the amount of the Group IV-A metallic component is ordinarily selected to produce a composite containing an atomic ratio of Group IV-A metal to platinum group metal within the broad range of about 0.05:1 to 10:1. However, for the Group IV-A metal to platinum group metal ratio, the best practice is to select this ratio on the basis of the following preferred range for the individual species: (1) for germanium, it is about 0.3:1 to 10:1, with the most preferred range being about 0.6:1 to about 6:1; (2) for tin, it is about 0.1:1 to 3:1, with the most preferred range being about 0.5:1 to 1.5:1; and (3) for lead, it is about 0.05:1 to 0.9:1, with the most preferred range being about 0.1:1 to 0.75:1.

Another significant parameter for the instant catalyst is the "total metals content" which is defined to be the sum of the platinum group component, the nickel component and the Group IV-A metallic component, calculated on an elemental metal basis. Good results are ordinarily obtained with the subject catalyst when this parameter is fixed at a value of about 0.15 to about 5 wt.%, with best results ordinarily achieved at a metals loading of about 0.3 to about 2 wt.%.

From the above discussion of each of the essential and preferred ingredients of the catalytic composite, it is evident that a particularly preferred catalytic composite for hydrocarbon isomerization comprises a combination of a platinum component, a nickel component, a germanium component, and a halogen component with an alumina carrier material in amounts sufficient to result in the composite containing about 0.1 to about 5 wt.% halogen, about 0.05 to about 1 wt.% platinum, about 0.05 to about 2 wt.% nickel and about 0.05 to about 2 wt.% germanium.

Regardless of the details of how the components of the catalyst are combined with the porous carrier material, the final catalyst generally will be dried at a temperature of about 200°F. to about 600°F. for a period of from about 2 to about 24 hours or more, and finally calcined at a temperature of about 700°F. to about 1100°F. in an air atmosphere for a period of about 0.5 to about 10 hours in order to convert the metallic components substantially to the oxide form. In the case where a halogen component is utilized in the catalyst, best results are generally obtained when the halogen content of the catalyst is adjusted during the calcination step by including water and a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a preferred range of about 0.1 to about 5 wt.%.

Although not essential, the resulting calcined catalytic composite can be impregnated with an anhydrous Friedel-Crafts type metal halide, particularly aluminum chloride. Other suitable metal halides include aluminum bromide, ferric chloride, ferric bromide, zinc chloride, beryllium chloride, etc. It is preferred that the porous carrier material be a refractory inorganic oxide containing chemically combined hydroxyl groups such as those contained in silica and any of the other aforementioned refractory inorganic oxides including the various crystalline aluminosilicates and clays. Particularly preferred is alumina.

The presence of chemically combined hydroxyl groups in the porous carrier material allows a reaction to occur between the Friedel-Crafts metal halide and the hydroxyl groups of the carrier material. For example, aluminum chloride reacts with the hydroxyl groups of alumina to yield $Al-O-AlCl_2$ active centers which enhance the catalytic behavior of the original platinum group-Group IV-A nickel composite, particularly for isomerizing $C_4-C_9$ paraffins. It is desired that the combined halogen content present within the calcined composite be within the lower portion of the 0.1 to 10 wt.% halogen range. This combined halogen substitutes to some degree for the hydroxyl groups which are necessary for the reaction with the Friedel-Crafts metal halide.

The Friedel-Crafts metal halide can be impregnated onto the calcined catalytic composite containing combined hydroxyl groups by the sublimation of the halide onto the group IV-A metal — nickel-platinum composite under conditions such that the sublimed metal halide is combined with the hydroxyl groups of the composite. This reaction is typically accompanied by the elimination of about 0.5 to about 2.0 moles of hydrogen chloride per mole of Friedel-Crafts metal halide reacted. For example, in the case of subliming aluminum chloride which sublimes at about 184°C., suitable impregnation temperatures range from about 190°C. to about 700°C., preferably from about 200°C. to about 600°C. The sublimation can be conducted at atmospheric pressure or under increased pressure and in the presence of diluents such as inert gases, hydrogen, and/or light paraffinic hydrocarbons. This impregnation may be conducted batchwise but a preferred method is to pass sublimed $AlCl_3$ vapors in admixture with an inert gas such as hydrogen through a calcined catalyst bed. This method both continuously deposits the aluminum chloride and removes the evolved HCl.

The amount of halide combined with the Group IV-A—nickel-platinum composite may range from about 1 percent to about 100 percent of the original metal halide-free composite. The final composite has unreacted metal halide removed by treating the composite at a temperature above the sublimation temperature of the halide for a time sufficient to remove therefrom any unreacted metal halide. For AlCl₃, temperatures of about 400°C. to about 600°C. and times of from about 1 to about 48 hours are sufficient.

It is preferred that the resultant calcined catalytic composite be subjected to a substantially water-free reduction step prior to its use in the conversion of hydrocarbons. This step is designed to insure a uniform and finely divided dispersion of the platinum group metallic component throughout the carrier material. Preferably, substantially pure and dry hydrogen (i.e., less than 20 vol. ppm. $H_2O$) is used as the reducing agent in this step. The reducing agent is contacted with the calcined catalyst at conditions including a temperature of about 800°F. to about 1,000°F. selected to reduce the platinum group component to the metallic state. This reduction step may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding step designed to incorporate in the catalytic composite from about 0.05 to 0.50 wt.% sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50°F. up to about 1,000°F. It is generally a good practice to perform this presulfiding step under substantially water-free conditions.

According to the present invention, a hydrocarbon charge stock and hydrogen are contacted with a catalyst of the type described above in a hydrocarbon isomerization zone. This contacting may be accomplished by using the catalyst in a fixed bed system, a moving bed system, a fluidized bed system, or in a batch type operation; however, in view of the danger of attrition losses of the valuable catalyst and of well-known operational advantages, it is preferred to use a fixed bed system. In this system, a hydrogen-rich gas and the charge stock are preheated by any suitable heating means to the desired reaction temperature and are then passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in a liquid phase, a mixed liquid-vapor phase, or a vapor phase when they contact the catalyst, with best results obtained in the vapor phase.

The process of this invention, utilizing the catalyst hereinbefore set forth, for isomerizing isomerizable olefinic or saturated hydrocarbons is preferably effected in a continuous down-flow fixed bed system. One particular method is continuously passing the hydrocarbon preferably commingled with about 0.1 to about 10 moles or more of hydrogen per mole of hydrocarbon to an isomerization reaction zone containing the catalyst and maintaining the zone at proper isomerization conditions such as a temperature in the range of about 0°C. to about 425°C. or more and a pressure of about atmospheric to about 100 atmospheres or more. The hydrocarbon is passed over the catalyst at a liquid hourly space velocity (defined as volume of liquid hydrocarbon passed per hour per volume of catalyst) of from about 0.1 to about 10 hr.$^{-1}$ or more. In addition, diluents such as argon, nitrogen, etc., may be present. The isomerized product is continuously withdrawn, separated from the reactor effluent, and recovered by conventional means, preferably fractional distillation, while the unreacted starting material may be recycled to form a portion of the feed stock.

When effecting hydroisomerization of olefins, namely, the conversion of an olefin to a branched or more highly branched paraffin, a hydrogen to olefin mole ratio of at least 1:1 is preferred. Particularly preferred hydroisomerization conditions include hydrogen to hydrocarbon mole ratios of about 2:1 to about 10:1 or more and pressures of 30 to 200 atmospheres. In general, hydrogenating conditions are desired and effected by means well known to those trained in the art. However, preferred conditions to be utilized for isomerization of olefins without hydrogenating the olefin include temperatures of about 0°C. to about 300°C. and pressures of about atmospheric to about 50 atmospheres.

Likewise, the process of this invention for isomerizing an isomerizable alkylaromatic hydrocarbon is preferably effected by contacting the aromatic in a reaction zone containing the hereinbefore described catalyst with a fixed catalyst bed by passing the hydrocarbon in a downflow fashion through the bed while maintaining the zone at proper alkylaromatic isomerization conditions such as a temperature in the range of from about 0°C. to about 600°C. or more and a pressure of atmospheric to about 100 atmospheres or more. The hydro-carbon is passed preferably in admixture with hydrogen at a hydrogen to hydrocarbon mole ratio of about 1:1 to about 25:1 or more at a liquid hourly hydrocarbon space velocity of about 0.1 to about 20 hr.$^{-1}$ or more. Other inert diluents such as nitrogen, argon, etc., may be present. The isomerized product is continuously withdrawn, separated from the reactor effluent by conventional means including fractional distillation or crystallization and recovered.

ILLUSTRATIVE EMBODIMENTS

The following illustrations are given to illustrate the preparation of the catalytic composite to be utilized in the process of this invention and its use in the isomerization of isomerizable hydrocarbons. However, these examples are not presented for purposes of limiting the scope of the invention but in order to further illustrate the embodiments of the present process.

ILLUSTRATION I

This illustration demonstrates one method of preparing the preferred catalytic composite to be used in the process of the present invention.

An alumina carrier material comprising 1/16 inch alumina spheres was prepared by forming an alumina hydroxyl chloride sol by dissolving substantially pure aluminum pellets in a hydrochloric acid solution, adding hexamethylenetetramine to the resulting sol, gelling the resulting solution by dropping it into an oil bath to form spherical particles of an aluminum hydrogel, aging and washing the resulting particles with an ammoniacal solution and finally drying and calcining the aged and washed particles to form spherical particles of gamma alumina containing about 0.3 wt.% combined chloride. Additional details as to this method of preparing the preferred carrier material are given in the teachings of U. S. Pat. No. 2,620,314.

A measured amount of germanium tetrachloride was dissolved in anhydrous ethanol. The resulting solution was then aged at room temperature until an equilibrium condition was established. An aqueous solution containing chloroplatinic acid, nickel chloride, and hydrogen chloride was then prepared. The two solutions were then intimately admixed and used to impregnate the gamma-alumina particles in amounts, respectively, calculated to result in a final composite containing on an elemental basis, 0.5 wt.% Ge, 0.5 wt.% Ni and 0.375 wt.% Pt. In order to insure uniform distribution of the metallic components throughout the carrier material, this impregnation step was performed by adding the carrier material particles to the impregnation mixture with constant agitation. In addition, the volume of the solution was approximately two times the volume of the carrier material particles. The impregnation mixture was maintained in contact with the carrier material particles for a period of about one-half hour at a temperature of about 70°F. Thereafter, the temperature of the impregnation mixture was raised to about 225°F. and the excess solution was evaporated in a period of about 1 hour. The resulting dried particles were then subjected to a calcination treatment in an air atmosphere at a temperature of about 925°F. for about 1 hour. The calcined spheres were then contacted with an air stream containing $H_2O$ and HCl in a mole ratio of about 40:1 for about 4 hours at 975°F. in order to adjust the halogen content of the catalyst particles to a value of about 0.9.

The resulting catalyst particles were analyzed and found to contain, on an elemental basis, about 0.375 wt.% platinum, about 0.5 wt.% germanium, about 0.5 wt.% nickel and about 0.85 wt.% chloride. The atomic ratio of nickel to platinum was approximately 4.4:1. Likewise, the atomic ratio of germanium to platinum was 3.56:1.

Thereafter, the catalyst particles were subjected for one hour to a dry pre-reduction treatment by contacting them with a substantially pure hydrogen stream containing less than 20 vol. ppm. $H_2O$ at a temperature of about 1,000°F., a pressure slightly above atmospheric and a flow rate of the hydrogen stream through the catalyst particles corresponding to a gas hourly space velocity of about 720 hr.$^{-1}$.

ILLUSTRATION II

A portion of the catalyst prepared in Example I is placed, as an active catalytic composite, in a continuous-flow fixed-bed isomerization pilot plant of conventional design. This plant consists of a nominal 1-inch inside-diameter reactor wherein the catalyst is placed as a fixed bed in the latter portion of the reactor. Tabular alumina is placed above this catalyst to function as a preheat section and to insure isothermal reactor conditions within the catalyst bed. In this reactor, the hydrocarbon charge stock is commingled with hydrogen and heated to the desired isomerization reaction temperature before contacting the hydrocarbon and hydrogen mixture with the catalyst. The resultant effluent is cooled and a normally gaseous and liquid product is recovered and analyzed.

To illustrate the utility of this catalyst to isomerize $C_8$ alkylaromatics, a charge stock containing, on a weight percent basis, 20.0 percent ethylbenzene, 10.0 percent para-xylene, 50.0 percent meta-xylene, and 20.0 percent ortho-xylene is commingled with about 10 moles of hydrogen per mole of hydrocarbon, and continuously charged at a liquid hourly space velocity (LHSV) of 3 to the reactor which is maintained at a reactor pressure of about 500 psig. and a reactor temperature of about 400°C. The resulting product evidences essentially equilibrium conversion to para-xylene with only insignificant amounts of cracked products and hydrogenated products thus indicating an efficient alkylaromatic isomerization process.

ILLUSTRATION III

Another portion of the catalyst produced by the method of Example I is placed in a continuous-flow fixed-bed isomerization plant as described in Example II. Substantially pure meta-xylene is used as a charge stock. This charge stock is commingled with about 10 moles of hydrogen per mole of hydrocarbon and is continuously passed at 4.0 LHSV to the reactor which is maintained at a pressure of about 400 psig. and a temperature of about 300°C. Substantial conversion of meta-xylene to para-xylene is obtained — i.e., greater than 80 percent of equilibrium.

ILLUSTRATION IV

A catalyst essentially identical to that produced in Example I but containing only 0.40 wt.% combined halogen is used to isomerize 1-butene in an appropriate pilot plant isomerization reactor, at a reactor pressure of about 500 psig., a 0.2:1 $H_2$ to olefin mole ratio and a reactor temperature of about 130°C. Substantial conversion to 2-butene is observed.

ILLUSTRATION V

The same catalyst as utilized in Example IV is charged to an appropriate continuous-flow fixed-bed isomerization reactor of conventional design maintained at a reactor pressure of about 1,000 psig. and a reactor temperature of about 175°C. 3-methyl-1-butene in admixture with hydrogen at a 0.2:1 $H_2$/olefin mole ratio is continuously passed to this reactor with substantial conversion to 2-methyl-2-butene being observed.

ILLUSTRATION VI

A catalyst, identical to that produced in Example I except that the gamma-alumina particles are contacted with hydrogen fluoride to provide a 2.9 wt.% combined fluoride content in the catalyst, is placed in an appropriate continuous-flow fixed-bed isomerization reaction of conventional design. This reactor is maintained at a reactor pressure of about 350 psig. and a reactor temperature of about 200°C. Normal hexane is continuously charged to the reactor in admixture with hydrogen at a 10:1 hydrogen to hexane mole ratio. An analysis of the resultant product stream shows substantial conversion to 2,2-dimethylbutane, 2,3-dimethylbutane, 2-methylpentane and 3-methylpentane.

ILLUSTRATION VII

Two hundred grams of the reduced platinum-nickel-germanium-alumina composite of Example I are placed in a glass-lined rotating autoclave along with 150 grams of anhydrous aluminum chloride. The autoclave is sealed, pressured with 25 psig. of hydrogen, and heated and rotated for 2 hours at 300°C. The autoclave is then allowed to cool, depressured through a caustic scrubber, opened and the final composite removed therefrom. An analysis of the resultant composite indicates about a 15 wt.% gain based on the original platinum-nickel-germanium composite equivalent to the aluminum chloride sublimed and reacted thereon. The caustic scrubber is found to have adsorbed hydrogen chloride equivalent to about 5.0 wt.% of the original composite corresponding to about 0.8 moles of HCl evolved per mole of aluminum chloride reacted therewith.

ILLUSTRATION VIII

A portion of the catalyst prepared in Example VII is placed in an appropriate continuous-flow fixed-bed pilot plant isomerization reactor and used to isomerize normal butane. The normal butane is continuously passed to the reactor at a 1.0 liquid hourly space velocity, a 0.5 hydrogen to hydrocarbon mole ratio while the reactor is maintained at a reactor pressure of 450 psig. and a reactor temperature of 220°C. Substantial conversion of normal butane to isobutane is observed . . . i.e., approximately a conversion of normal butane to isobutane of about 45 wt.% of the original normal butane charged to the reactor.

ILLUSTRATION IX

A portion of the catalyst as prepared in Example I is placed in an appropriate continuous-flow isomerization reactor maintained at a reactor temperature of about 200°C. and a reactor pressure of about 250 psig. Methylcyclopentane, in admixture with hydrogen, is continuously passed to this reactor with a substantial conversion to cyclohexane being observed.

ILLUSTRATION X

A further portion of the catalyst as prepared in Illustration I is placed in an appropriate hydroisomerization reactor maintained at a temperature of about 220°C. and a pressure of about 450 psig. A 4:1 hydrogen to 2-pentene mole ratio charge is continuously passed to the reactor with substantial conversion to isopentane being observed.

I claim as my invention:

1. A process for isomerizing an isomerizable hydrocarbon which comprises contacting said hydrocarbon, at isomerization conditions, with a catalytic composite comprising a combination of catalytically effective amounts of a platinum group component, a nickel component and a Group IV-A metallic component with a porous carrier material.

2. The process of claim 1 further characterized in that said platinum group metal is platinum, palladium, or a compound of platinum or palladium.

3. The process of claim 1 further characterized in that said Group IV-A metallic component is germanium or a compound of germanium.

4. The process of claim 1 further characterized in that said Group IV-A metallic component is tin or a compound of tin.

5. The process of claim 1 further characterized in that said Group IV-A metallic component is lead or a compound of lead.

6. The process of claim 1 further characterized in that said porous carrier material is a refractory inorganic oxide.

7. The process of claim 6 further characterized in that said refractory inorganic oxide is alumina.

8. The process of claim 1 further characterized in that said catalytic composite contains from about 0.1 to about 10 wt.% of a halogen component.

9. The process of claim 8 further characterized in that said halogen is fluorine or chlorine.

10. The process of claim 1 further characterized in that said catalytic composite contains, on an elemental basis, about 0.01 to about 2 wt.% of the platinum group metal, about 0.01 to about 5 wt.% of nickel and about 0.01 to about 5 wt.% of the Group IV-A metal.

11. The process of claim 1 further characterized in that said isomerizable hydrocarbon is a saturated hydrocarbon and said isomerization conditions include a temperature of about 0°C. to about 425°C., a pressure of about atmospheric to about 100 atmospheres, and a liquid hourly space velocity of about 0.1 to about 10 hrs.$^{-1}$.

12. The process of claim 11 further characterized in that said hydrocarbon is commingled with about 0.1 to about 10 moles of hydrogen per mole of hydrocarbon.

13. The process of claim 11 further characterized in that said hydrocarbon is a paraffinic hydrocarbon.

14. The process of claim 13 further characterized in that said hydrocarbon is a $C_4$-$C_9$ alkane.

15. The process of claim 14 wherein said catalytic composite has combined therewith about 1 to about 100 wt.% Friedel-Crafts metal halide, calculated on a Friedel-Crafts metal halide free composite.

16. The process of claim 1 further characterized in that said hydrocarbon is an olefinic hydrocarbon and said isomerization conditions include a temperature of about 0°C. to about 425°C. and a pressure of about atmospheric to about 100 atmospheres.

17. The process of Claim 16 further characterized in that said olefin is a $C_4$-$C_7$ isomerizable olefin.

18. The process of Claim 1 further characterized in that said isomerizable hydrocarbon is an alkylaromatic hydrocarbon and said isomerization conditions include a temperature of about 0°C. to about 600°C., a pressure of about atmospheric to about 100 atmospheres, and a liquid hourly space velocity of about 0.1 to about 20 hours$^{-1}$.

19. The process of claim 18 further characterized in that said hydrocarbon is commingled with about 1 to about 25 moles of hydrogen per mole of hydrocarbon.

20. The process of claim 18 further characterized in that said hydrocarbon is a $C_8$ alkylaromatic or a non-equilibrium mixture of $C_8$ alkylaromatics.

* * * * *